United States Patent

Häkkinen et al.

Patent Number: 6,015,112
Date of Patent: Jan. 18, 2000

[54] ARRANGEMENT FOR LEADING FLEXIBLE ELEMENTS TO A ROCK DRILL, AND A HOSE REEL STRUCTURE

[75] Inventors: Leo Häkkinen, Tampere; Timo Laitinen, Viiala, both of Finland

[73] Assignee: Tamrock OY, Finland

[21] Appl. No.: 09/101,641

[22] PCT Filed: Jan. 14, 1997

[86] PCT No.: PCT/FI97/00018

§ 371 Date: Jul. 20, 1998

§ 102(e) Date: Jul. 20, 1998

[87] PCT Pub. No.: WO97/26435

PCT Pub. Date: Jul. 24, 1997

[30] Foreign Application Priority Data

Jan. 15, 1996 [FI] Finland ..................... 960187

[51] Int. Cl.[7] .......... B65H 27/00; B65H 75/18; B65H 57/14

[52] U.S. Cl. .......... 242/397.5; 242/407; 242/603; 242/614; 242/615.2; 173/160

[58] Field of Search ................ 242/407, 118.4, 242/603, 614, 388.6, 388.9, 388.91, 378.4, 397.5, 615.2; 137/355.17; 173/160

[56] References Cited

U.S. PATENT DOCUMENTS 3,500,941  3/1970  Rudman ................ 173/160
4,039,032  8/1977  Morrison ............... 173/193

FOREIGN PATENT DOCUMENTS 24 19 470  11/1975  Germany.

Primary Examiner—John Q. Nguyen
Attorney, Agent, or Firm—Nixon & Vanderhye P.C.

[57] ABSTRACT

An arrangement for leading flexible elements, such as hoses, around a hose reel to a rock drill moving along a feed beam, in which the flexible elements are coupled immovably to the feed beam and to the rock drill, characterized in that the flexible elements are mounted on the hose reel in at least two successive layers in the radial direction of the hose reel and each radial layer is pivoted so as to revolve around a shaft of the hose reel independently of the other layers.

9 Claims, 2 Drawing Sheets

ARRANGEMENT FOR LEADING FLEXIBLE ELEMENTS TO A ROCK DRILL, AND A HOSE REEL STRUCTURE

BACKGROUND OF THE INVENTION

The invention relates to an arrangement for leading flexible elements, such as hoses, around a hose reel to a rock drill moving along a feed beam, in which arrangement the flexible elements are coupled at least at one point in their longitudinal direction immovably relative to the feed beam, led to travel towards the rear end of the feed beam, around a hose reel that revolves round a shaft essentially perpendicular relative to the feed beam and moves at one half the rate of the rock drill relative to the feed beam behind the rock drill in the same direction with respect to the rate of the rock drill, and further to the rock drill or a carriage thereof.

The invention further relates to a hose reel structure for leading flexible elements to a rock drill moving along a feed beam, the hose reel structure comprising a hose reel that revolves round a shaft and the hose reel comprising control means for each flexible element, such as a guide groove or the like for leading the flexible elements in a preset order around the hose reel.

Several different hoses have to be led to rock drills for them to operate. However, the hoses have to be kept straight and a certain tension maintained during drill movement. This is typically achieved by arranging the hoses so that they travel from the drill towards the rear portion of the feed beam around a hose reel in the rear portion, and further towards the front portion of the feed beam, and by coupling the movements of the drill and the hose reel so that the hose reel moves to the same direction as the drill, but at one half its rate, and thus half the distance that the drill moves. In known solutions all hoses travel around the same reel structure so that the hoses are on top of each other in the axial direction of the reel. Furthermore, in cylinder feeds a wire is used in the same way as hoses for turning the hose reel around to achieve movement, the hose reels in use being quite high. As a result, a hose reel typically extends significantly farther as the drill in the elevation of the feed beam and hence the upper portion of the hose reel is easily damaged especially when holes are drilled near the surface of a tunnel. In some known solutions a separate idler wheel is used for the wire coaxially with the actual hose reel, but even in this case they are arranged in succession in the axial direction of the hose reel thus forming a high structure. Such solutions are known e.g. from U.S. Pat. No. 3,500,941 and German Offenlegungsschrift 2,419,470.

BRIEF SUMMARY OF THE INVENTION

It is an object of the present invention to provide an arrangement and a hose reel structure that eliminate the drawbacks of known solutions and provide a lower hose reel structure and leading of hoses and possibly a hose reel transfer wire than before. The arrangement of the invention is characterized in that flexible elements are mounted around the same hose reel in at least two successive layers in the radial direction of the hose reel and that each radial layer is pivoted so as to revolve round a shaft of the hose reel independently of other layers.

The hose reel structure of the invention is characterized in that it comprises at least two reel flanges between which a groove is formed into which at least one of the flexible elements with the smallest diameter can be placed, that the outer edges of the reel flanges comprise support surfaces suited to support flexible elements with diameters wider than the width of the groove for arranging the thicker flexible elements to revolve round the hose reel at the groove on the support surfaces, whereby at least two flexible elements revolve round the hose reel radially at the groove, and that each flexible element is pivoted so as to revolve round the shaft of the hose reel independently of other flexible elements at the same groove.

It is an essential idea of the invention that flexible elements, that is hoses, and possibly a wire, are arranged in succession in the radial direction of the hose reel, so that at least two hoses or a hose and a wire are arranged radially in succession and axially substantially at the same point, so that they form at least two layers in the radial direction of the hose reel. It is a further essential idea of the invention that the hoses or the hose and the wire at different points of the same groove in the radial direction are pivoted so as to revolve round the shaft of the hose reel independently of each other, whereby they can freely travel and settle correctly when winding themselves round the hose reel.

An advantage of the arrangement and the hose reel structure of the invention is that by the use of hoses of suitable thickness, the hoses and wires can be arranged to travel as a group both on top of each other and side by side, whereby the hose reel becomes lower and it becomes simpler and easier to lead the hoses to the drill. Furthermore, the risk of damage to the hose reel decreases and also a narrower look-out angle is achieved, minimising unnecessary breaking and facilitating drilling.

BRIEF DESCRIPTION OF THE DRAWINGS

The invention is described in greater detail in the attached drawings, in which.

DETAILED DESCRIPTION OF THE INVENTION

Figure 1:
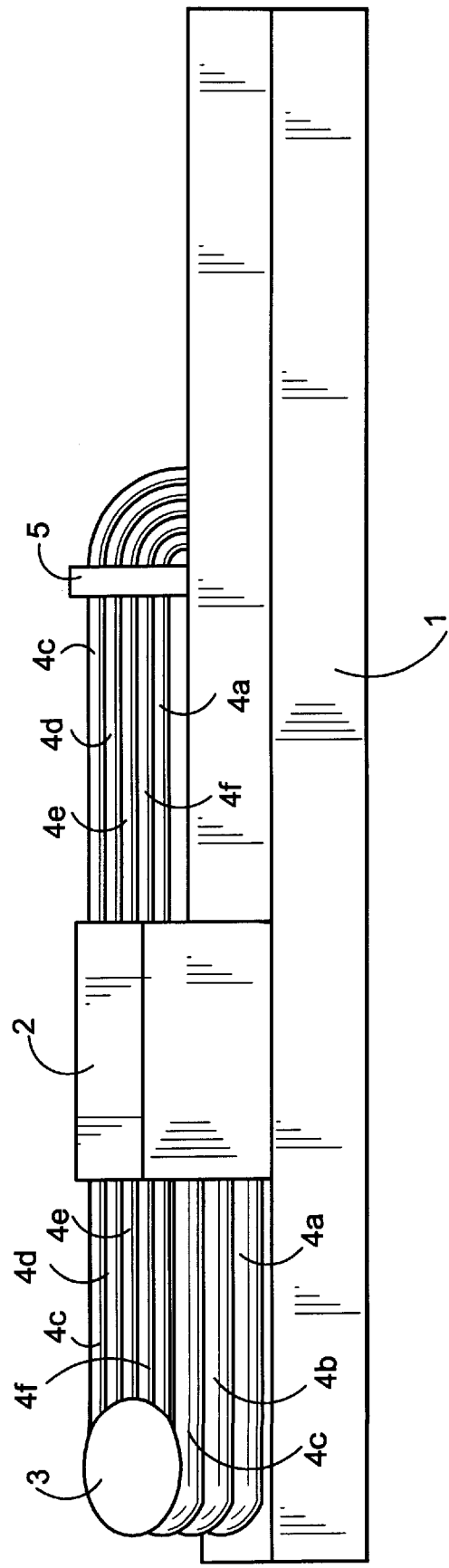
FIG. 1 schematically shows the travel of hoses from a rock drill to a hose reel and around it, FIG. 2 schematically shows a hose reel structure applicable to the arrangement of FIG. 1 as a side view and in partial cross-section, FIG. 3 schematically shows a partial view of another embodiment of a bearing application for hoses in the hose reel structure of FIG. 2, and FIG. 4 schematically shows a third embodiment of the invention, in which three hoses or the like with different diameters are arranged to travel in succession in the radial direction of a hose reel.

FIG. 1 shows an arrangement with a conventional rock drill feed beam 1, on which a rock drill 2 is moving. A hose reel 3, around which flexible elements, that is hoses 4a to 4e and a wire 4f, revolve, is arranged behind the rock drill 2 at the rear end of the feed beam. The hoses 4a to 4e are connected at one end to the drill 2 and they revolve around the hose reel 3 and return towards the front end of the feed beam 1, and are immovably fastened relative to the feed beam 1 with a hose clip 5. From the hose clip 5 the hoses go further to the rock drill carrier (not shown). The wire 4f is fastened at one end to the drill 2 carriage (not numbered or shown) and similarly revolves with the hoses 4a to 4d around the hose reel 3 and is fastened at the other end to the feed beam 1. The structure of the hoses and the operation of a rock drill are known and obvious to those skilled in the art, and are not described in detail here.

As is shown in FIG. 1, the hoses 4a to 4e and the wire 4f are placed so that three of them are on top of each other in the elevation of the hose reel 3 and two hoses or a hose and a wire are side by side at each point in the radial direction of the hose reel, the inner hoses and the wire revolving around the hose reel 3 along a smaller arc.

Figure 2:
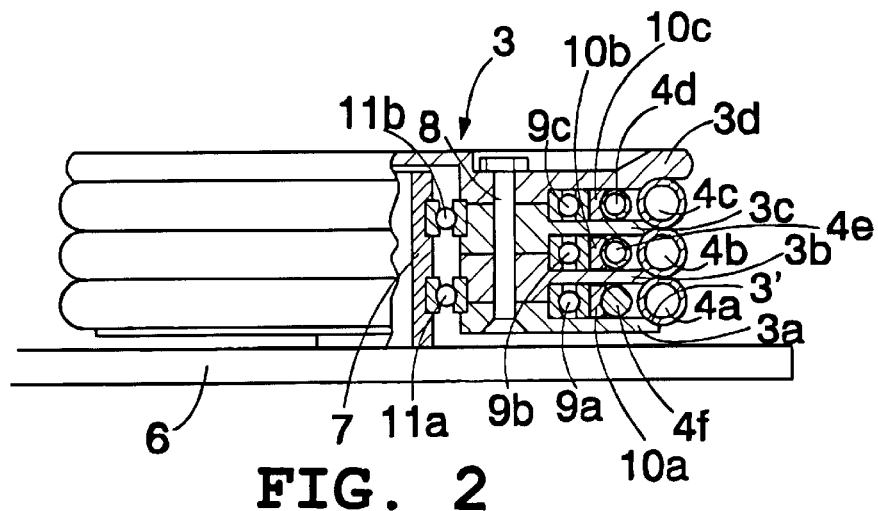

FIG. 2 schematically shows the hose reel structure of the invention shown in FIG. 1, by means of which the hoses can be arranged to travel as shown in FIG. 1. In FIG. 2 the hose reel 3 is partially cross-sectioned to show its exact structure. The hose reel 3 is fastened to its carrier 6 and rotates around a shaft 7. The hose reel 3 is formed of four reel flanges 3a to 3d, mounted on top of each other in the axial direction of the hose reel and immovably fastened to each other by bolts 8 so that they form a fixed reel portion. Guide rings 10a to 10c with a concave outer surface are arranged between the reel flanges 3a to 3d with separate bearings 9a to 9c. The hoses 4d and 4e with smaller diameters and the wire 4f are placed against these guide rings. This way they can revolve freely relative to the rest of the hose reel on their bearings 9a to 9c. The hoses 4a to 4c with wider diameters are placed against the hose reel 3 supported by support surfaces 3' cut out in the outer edges of the reel flanges 3a to 3d, thereby being supported by the reel flanges and not able to extend deeper into the grooves between the reel flanges. The one-piece fixed reel portion formed by the reel flanges is mounted to the shaft 7 by means of bearings 11a to 11b, whereat, with the hose reel 3 revolving around the shaft 7 at a rate achieved by the movement of the hoses 4a to 4c, the hoses 4d and 4e with smaller diameters and the wire 4f revolve independently relative to the hose reel 3 and the hoses 4a to 4c with wider diameters.

Figure 3:
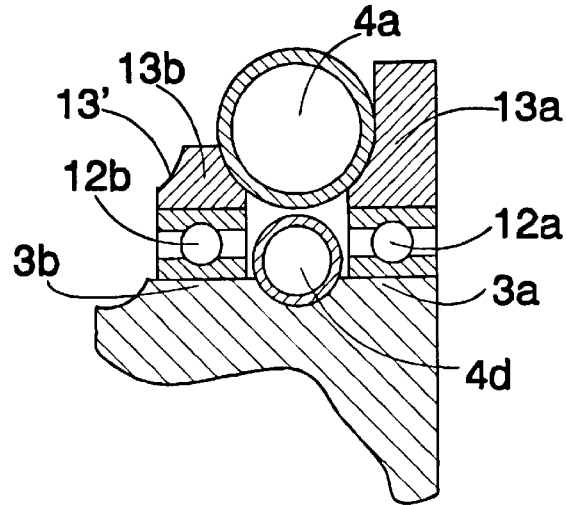

FIG. 3 schematically and partially shows another embodiment for the implementation of a hose reel structure applicable to FIG. 1. In this embodiment, a separate bearing application of the hoses of the hose reel 3 is implemented so that the reel flanges 3a to 3d form fixed chute-like grooves between themselves, around which the hoses 4d, 4e with smaller diameters and the wire 4f revolve at the same rate. In the same way, the outer hoses with wider diameters are pivoted by bearings 12a to 12d with bolsters 13a to 13d on top of them mounted around the reel flanges 3a to 3d. The bolsters 13a and 13d are formed so that they narrow down from the bearings 12a to 12d radially outward and have a convex surface so that the hoses 4a to 4c with a wider diameter are supported by the support surfaces 13' of the bolsters 13a to 13d and can revolve relative to the flanges 3a to 3d at an independent rate, whereby all hoses and the wire can again move at a suitable rate relative to each other while the hose reel 3 is revolving.

Figure 4:
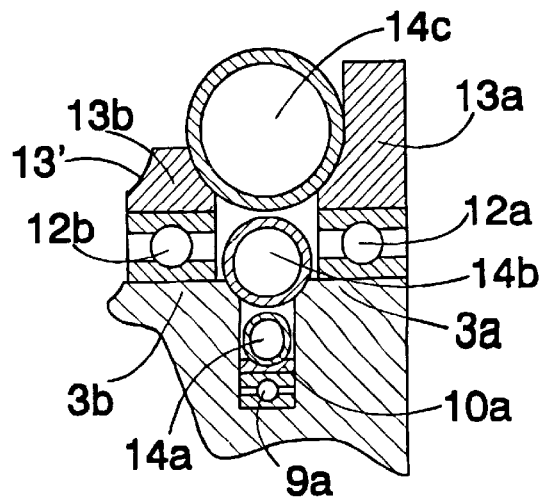

FIG. 4 schematically and partially shows a third embodiment of the hose reel structure of the invention, where the solutions of FIGS. 2 and 3 have been combined. In this Figure, as in FIG. 3, the hose reel has been shown only partly to illustrate the idea. As in FIG. 2, in this embodiment the hose reel 3 comprises a separate pivoted bolster 10a, revolving between the reel flanges 3a and 3b on the bearing 9a. This way, a hose with a small diameter or a wire can revolve freely relative to the reel flanges 3a and 3b. Chute-like support surfaces are formed in the reel flanges 3a and 3b, and in other corresponding flanges, on which the hose with the wider diameter of the hoses 14a can revolve on a hose reel portion formed by the reel flanges 3a and 3b and rotating at the same rate. The bolsters 13a and 13b are mounted on top of the flanges 3a and 3b with separate bearings 12a and 12b, and the hose 14c with a wider diameter than the inner hoses can again revolve freely on said bolsters independently of the rotation rate of the other hoses. Two such structures mounted side by side allow a plurality of hoses, and possibly a wire, to travel in only two planes resulting in a very low hose reel structure.

In the foregoing description and drawings the invention has been described only by way of example, and it is by no means to be so restricted. Two or more hoses can be mounted radially on top of each other, or in some cases the number of hoses at different axial points of the hose reel can vary. The invention can also be applied so that the hoses are arranged to travel in one line only and at one line the wire for moving the hose reel is mounted so that it travels at the bottom of a groove by the hose on a bearing mounted at the bottom of the groove, thus eliminating the complex and significantly high hose reel structure caused by a typically used separate wire wheel. It is essential, however, that the hoses on the same hose reel are pivoted so as to revolve independently of each other and that at the same time they are supported so that they cannot press against each other radially.

We claim:

1. Arrangement for leading flexible elements, such as hoses, around a hose reel to a rock drill moving along a feed beam, in which arrangement the flexible elements are coupled at least at one point in their longitudinal direction immovably relative to the feed beam, led to travel towards the rear end of the feed beam, around a hose reel that revolves round a shaft essentially perpendicular relative to the feed beam and moves at one half the rate of the rock drill relative to the feed beam behind the rock drill in the same direction with respect to the rate of the rock drill, and further coupled to the rock drill or a carriage thereof, characterized in that the flexible elements are mounted around the same hose reel in at least two successive layers in the radial direction of the hose reel and the hose reel is structured such that each radial layer is pivoted so as to revolve round the shaft of the hose reel independently of other layers.

2. Arrangement as claimed in claim 1, characterized in that the flexible elements are mounted in at least three successive layers in the radial direction of the hose reel.

3. Arrangement as claimed in claim 1, characterized in that in each layer the flexible elements are substantially on top of each other in the axial direction of the hose reel.

4. Arrangement as claimed in claim 1, characterized in that the flexible elements are hoses coupled to the rock drill, and possibly in addition a wire needed for moving the hose reel.

5. A hose reel structure for leading flexible elements, such as hoses, around a hose reel to a rock drill moving along a feed beam, the hose reel structure comprising a hose reel that revolves round a shaft and the hose reel comprising control means for each flexible element, such as a guide groove for leading the flexible elements in a preset order around the hose reel, characterized in that the hose reel comprises at least two reel flanges between which a groove is formed into which at least one of the flexible elements with the smallest diameter can be placed, that the outer edges of the reel flanges comprise support surfaces suited to support flexible elements with diameters wider than the width of the groove for arranging the thicker flexible elements to revolve round the shaft of the hose reel at the groove on the support surfaces, whereby at least two flexible elements revolve round the shaft of the hose reel radially at the groove, and the hose reel is structured such that each flexible element is pivoted so as to revolve round the shaft of the hose reel independently of other flexible elements at the same groove.

6. Hose reel structure as claimed in claim 5, characterized in that the hose reel comprises a plurality of reel flanges (3a–3d) so that a groove is formed between adjacent reel flanges (3a–3d), in each of which one of the flexible elements with a smaller diameter can be placed, and that the edges of reel flanges (3a–3d) adjacent to each groove comprise support surfaces suited to support flexible elements with diameters wider than the width of the corresponding groove for arranging the thicker flexible elements to revolve round the shaft of the hose reel at the groove on the support surfaces, whereby at least two layers of flexible elements revolve round the shaft of the hose reel radially at the groove, and that each flexible element is pivoted so as to revolve round the shaft of the hose reel independently of other layers at the same groove.

7. Hose reel structure as claimed in claim 5, characterized in that the bottom of each groove between the reel flanges (3a–3d) comprises a bearing (9a–9c), whereby each inner flexible element (4d, 4e) is pivoted so as to revolve independently of the reel flanges (3a–3d) on the bearing (9a–9c) of the groove.

8. Hose reel structure as claimed in claim 5, characterized in that at least part of the reel flanges (3a–3d) comprise a bearing (12a, 12b) arranged around the outer edges of the flanges, and correspondingly a bolster (13a, 13b) revolving round the reel flange (3a, 3b) on the bearing (12a, 12b), the bolsters comprising support surfaces for a flexible element (14c) with a wider diameter than the groove between the reel flanges (3a, 3b) for leading a flexible element, supported by the surfaces and rotatably pivoted relative to the reel flanges (3a, 3b) by means of the bearings (12a, 12b), on the flanges of the hose reel.

9. Hose reel structure as claimed in claim 5, characterized in that the hose reel is formed of loose reel flanges (3a–3d), fastened in succession on top of each other in the axial direction of the hose reel with bolts (8) and the resulting one-piece reel portion is pivoted so as to revolve round the reel shaft (7).

* * * * *